W. T. FISHER.
Bevel Square.
No. 79,062.
Patented June 23, 1868.
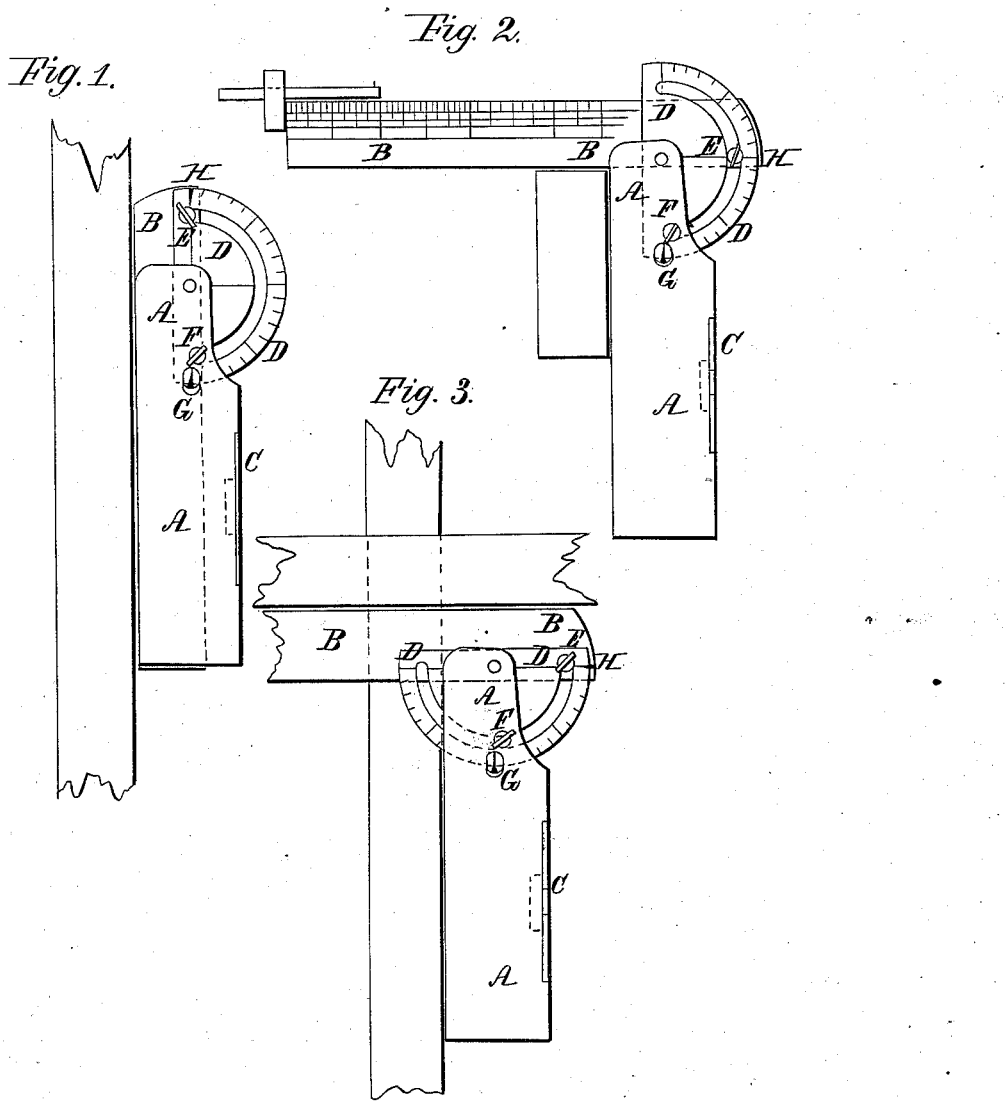

United States Patent Office.

W. T. FISHER, OF LENOIR'S, TENNESSEE.

Letters Patent No. 79,062, dated June 23, 1868.

---

IMPROVEMENT IN BEVEL-SQUARES.

---

The Schedule referred to in these Letters Patent and making part of the same.

---

TO ALL WHOM IT MAY CONCERN:

Be it known that I, W. T. FISHER, of Lenoir's, in the county of Roane, and State of Tennessee, have invented a new and useful Improvement in Bevel-Squares; and I do hereby declare that the following is a full, clear, and exact description thereof, which will enable others skilled in the art to make and use the same, reference being had to the accompanying drawings, forming part of this specification, in which—

Figures 1, 2, and 3 are side views of my improved instrument, showing it in different positions, and illustrating some of the uses to which it is applicable.

Similar letters of reference indicate like parts.

My invention has for its object to furnish an improved tool, simple in construction, easy of adjustment, and convenient in use, combining within itself many of the separate tools now necessarily used in every work-shop, such as a bevel-square, right-angle square, plumb and level, and which may also be used for measuring heights and distances, taking angles, and so forth; and it consists in the construction and combination of the various parts as hereinafter more fully described.

A is the stock, which is made with a longitudinal groove in its face, of sufficient depth to allow the blade B to shut up into it, as shown in fig. 1.

C is a spirit-bottle, enclosed in the edge of the stock A, so that when the blade B is shut into the said stock, the instrument may be used as a level.

The blade is laid off into scales upon one or both sides, and upon one or both edges, so that the said blade may be used for measuring adjusting-gauges or other tools, &c.

The blade B, near its upper end, is pivoted to the upper end of the stock A, as shown in the drawings, so that it may be shut into the stock A, as shown in fig. 1, or opened out, as shown in figs. 2 and 3, according to the particular use to which the instrument is to be applied.

D is a circular protractor, which is pivoted to the blade B and stock A by the same pivoting-pin that pivots the said blade to the said stock, said pivoting-pin passing through the centre of the circle of which the protractor D is a part.

The protractor D is slotted with a circular slot near its outer edge, through which slot pass the thumb-screws E and F, the thumb-screw E screwing into the blade B, to clamp the said protractor to the said blade, and the thumb-screw F screwing into a nut in a recess in the under part of the stock A, so that, by turning the said screw forward, the said nut may be drawn against the lower side of the said protractor, securely clamping it to the said stock.

The circular edge of the protractor D is divided off into a scale in the ordinary manner, and in the side of the stock A, directly over the said scale, is formed a hole, in which is secured an index-finger, G, pointing to the division-marks of said scale.

H is an index-finger, attached to the upper end of the blade B, in such a position as to point to the division-marks of the said scale, as shown in the drawings.

When the instrument is to be used as a plumb, or for any other purpose which requires the use of the outer edge of the blade B, the protractor is turned into the position shown in fig. 3. When, for such use, the blade B is required to be at right angles to the stock A, the protractor D is brought into such a position that the index-finger G may point to the division-mark 90 of the scale, where it is clamped by means of the screw F. The blade B is then adjusted so that the index-finger H may point to the 0-mark of the said scale, where it is secured by the screw E. In a similar manner, the blade B may be adjusted to stand at any desired angle with the stock A.

When the instrument is to be used as a try or bevel-square, or for any other purpose that requires the use of the inner edge of the blade B, the protractor D is turned into the position shown in fig. 2. When, for such use, the blade B is required to stand at right angles to the stock A, the said protractor is clamped to the stock A in such a position that the index-finger G may point to the 0-mark of the scale. The blade B is then adjusted and clamped in such a position that the index-finger H may point to the 90-mark of said scale.

In a similar manner the blade B may be adjusted to stand at any desired angle to the stock A, according to the requirements of the particular use to which the instrument is to be applied.

Having thus described my invention, I claim as new, and desire to secure by Letters Patent—

1. The arrangement of the fixed index, G, and movable index, H, with relation to each other, and the stock A, graduated blade B, and slotted protractor D, whereby the required angle of the blade with the stock is determined, as herein shown and described.

2. The described arrangement of the slotted stock A, graduated blade B, slotted protractor D, fixed index-finger G, movable index-finger H, and set-screws E F, all operating as described, for the purposes specified.

W. T. FISHER.

Witnesses:
   G. W. FONTE,
   GEORGE NICHOLS.